US005369306A

United States Patent [19]

Dib

[11] Patent Number: 5,369,306

[45] Date of Patent: Nov. 29, 1994

[54] AUTOMATIC LOCKING AND UNLOCKING UNIT FOR A VEHICLE

[76] Inventor: Rodrigo F. Dib, 3610 S. Nogales St., Apt. 217W, West Covina, Calif. 91792

[21] Appl. No.: 959,782

[22] Filed: Oct. 13, 1992

[51] Int. Cl.$^5$ .................. B60L 1/00

[52] U.S. Cl. .................. 307/10.1; 307/10.6

[58] Field of Search .................. 307/10.2, 10.1, 10.3, 307/10.4, 10.6; 180/286, 289; 70/272, 280–282

[56] References Cited

U.S. PATENT DOCUMENTS

| | | | |
|---|---|---|---|
| 3,643,479 | 2/1972 | Solow | 70/281 |
| 4,203,039 | 5/1980 | Pritchard | 307/10.1 |
| 4,373,149 | 2/1983 | Coste | 307/10.1 |
| 4,709,776 | 12/1987 | Metz | 180/281 |
| 4,727,735 | 3/1988 | Haag et al. | 70/264 |
| 4,942,747 | 7/1990 | Pinnow | 70/263 |
| 5,204,992 | 4/1993 | Carpenter | 307/10.7 |

*Primary Examiner*—A. D. Pellinen
*Assistant Examiner*—Peter Ganjoo
*Attorney, Agent, or Firm*—Hugh E. Smith

[57] ABSTRACT

An automatic locking and unlocking unit for a vehicle will lock the doors of the vehicle when the ignition is turned on and will eventually unlock the doors when the ignition is turned off. The unit senses voltage levels in the wires attached to the ignition lock and then activates the appropriate functional circuit to either lock or unlock the doors.

4 Claims, 1 Drawing Sheet

AUTOMATIC LOCKING AND UNLOCKING UNIT FOR A VEHICLE

BACKGROUND OF THE INVENTION

1. Field of the Invention

The present invention relates to lock systems and more particularly pertains to an automatic door locking/unlocking device for an automotive vehicle which is designed to automatically lock and unlock the vehicle's doors.

2. Description of the Prior Art

The use of automatic locking and unlocking devices for vehicles is known in the prior art. For example, U.S. Pat. No. 4,502,718, which issued to Sasaki, et al on Mar. 5, 1985 discloses a door lock/unlock system for an automotive vehicle to include a safety device for preventing a mis-operation thereof. Another patent of interest is U.S. Pat. No. 4,709,776 which issued to Marcus Metz on Dec. 1, 1987 and which is directed to an electrical circuit that automatically locks door locks of a motor vehicle at a predetermined speed. A further patent of interest is U.S. Pat. No. 4,848,114 that issued to Mary Rippe on Jul. 18, 1989 and directed to a locking system for the doors of an automotive vehicle.

While all of these above-mentioned patents illustrate the fact that automatic locking technology is available in the prior art, non of these devices and their associated circuits provide for both automatic locking and unlocking of vehicle doors without any driver input. As such, there appears to be a need for some type of device which would provide both automatic locking and unlocking of vehicle doors without driver input and in this respect, the present invention substantially fulfills this need.

SUMMARY OF THE INVENTION

In view of the foregoing disadvantages inherent in the known types of automatic locking systems now present in the prior art, the present invention provides an improved automatic locking and unlocking system for a vehicle wherein the same can be used to automatically lock and unlock vehicle doors without driver assistance. As such, the general purpose of the present invention, which will be described subsequently in greater detail, is to provide a new and improved automatic locking and unlocking system for a vehicle which has all the advantages of prior art automatic locking and unlocking systems and none of the disadvantages.

To attain this, the present invention essentially comprises an automatic locking and unlocking unit for a vehicle which will lock the doors of the vehicle when the ignition is turned on and will eventually unlock the doors when the ignition is turned off. The unit senses voltage levels in the wires attached to the ignition lock and then activates the appropriate functional circuit to either lock or unlock the doors.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved automatic locking and unlocking unit for a vehicle which has all the advantages of the prior art automatic locking and unlocking units for a vehicles and none of the disadvantages.

It is another object of the present invention to provide a new and improved automatic locking and unlocking unit for a vehicle which may be easily and efficiently manufactured and marketed.

It is a further object of the present invention to provide a new and improved automatic locking and unlocking unit for a vehicle which is of a durable and reliable construction.

An even further object of the present invention is to provide a new and improved automatic locking and unlocking unit for a vehicle which is susceptible of a low cost of manufacture with regard to both materials and labor, and which accordingly is then susceptible of low prices of sale to the consuming public, thereby making such automatic locking and unlocking units for a vehicle economically available to the buying public.

Still yet another object of the present invention is to provide a new and improved automatic locking and unlocking unit for a vehicle which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
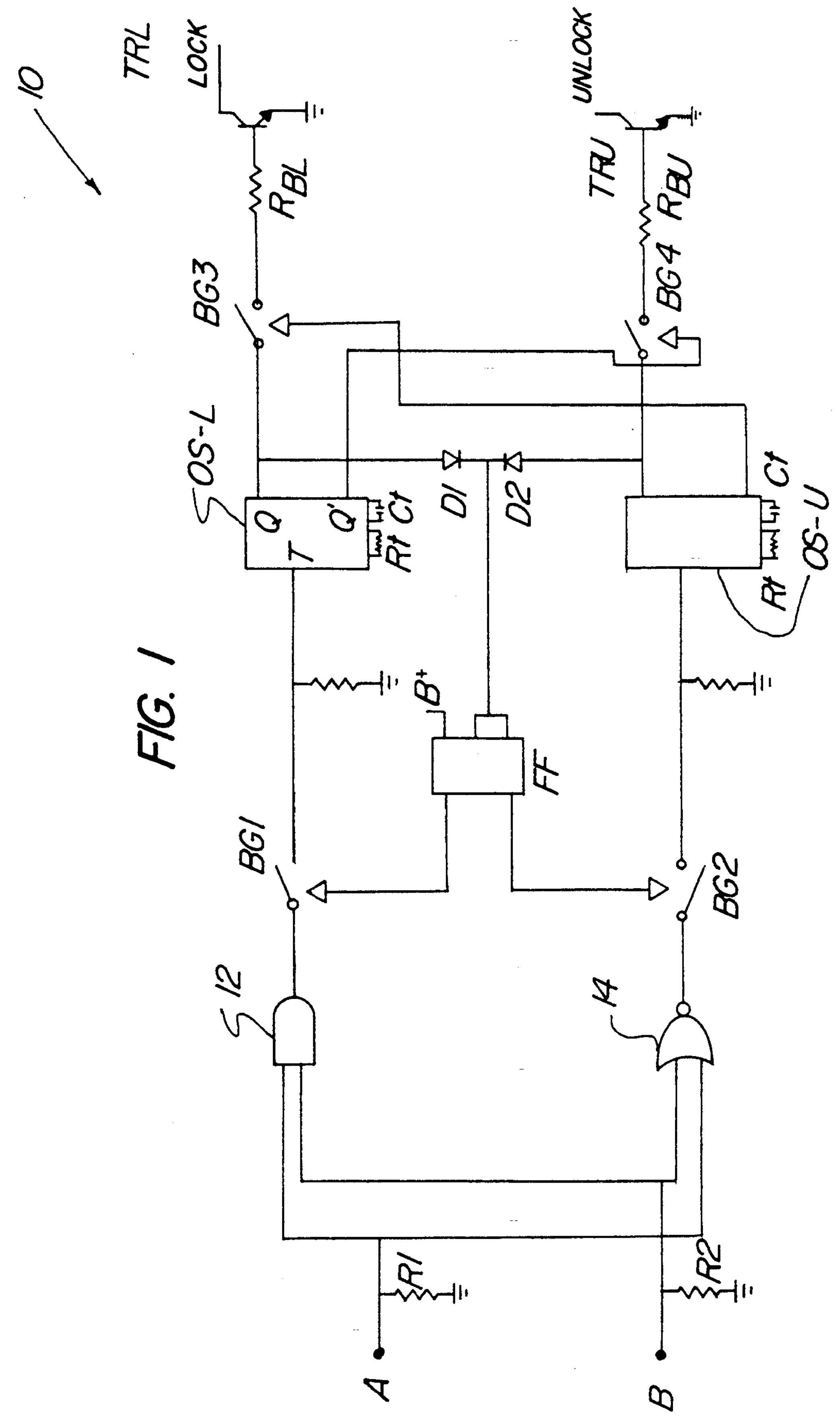
FIG. 1 is an electrical schematic of the automatic locking and unlocking unit for a vehicle comprising the present invention.

With reference now to the drawings, and in particular to FIG. 1 thereof, a new and improved automatic locking and unlocking unit for a vehicle embodying the principles and concepts of the present invention and generally designated by the reference numeral 10 will be described.

Initially, with no key in the vehicle's ignition and with the vehicle's engine turned off, the unit 10 is in a standby mode. Points A and B, which are start and ignition connections from the vehicle's ignition lock harness, are at this time being provided with no voltage so that the inputs at the AND gate 12 and the NOR gate 14 are being grounded by R1 and R2.

With both inputs low, the output of the AND gate 12 is low and regardless of the electrical state of the bilateral gate BG1, there will be no voltage to trigger the one-shot OS-L causing a low output and no base voltage to turn the transistor TRL on, whereby no locking of the vehicle's doors will occur.

The NOR gate 14, however, with its inputs low will produce a high output state. This high state could trigger one-shot OS-U but since the bilateral gate BG2 is non-conductive (hi-z state), no voltage will reach the trigger input of the one-shot OS-U, and the same cascade effect of low output will not produce an unlocking.

FF is a JK flip-flop set up to have Q high and Q' low. At this stage of operation, the flip-flop FF is acting as an unlock disabler and a lock enabler. Once the key is in the ignition and is switched from the "ignition" or "on" position to a "start" position, the AND gate 12 will produce a high output that will trigger the one-shot OS-L. The output of the one-shot OS-L will put enough voltage at the base of the transistor TRL to turn it on and produce a locking of the doors. The output of the one-shot OS-L (and also one-shot OS-U) is a one second pulse determined by Rt and Ct.

The output of the one-shot OS-L is at the same instant fed through diode D1 to the clock and K input of the flip-flop FF. This causes the flip-flop FF to toggle its values to Q=low and Q'=high which results in a disable mode for the lock circuit and an enable mode for the unlock circuit.

Since the inputs for the NOR gate 14 are no longer both low, the output will be low and no triggering of the one-shot OS-U will occur. When the key is taken out of the ignition, both inputs of the NOR gate will be low so as to produce a high output and since the bilateral gate BG2 is now conductive, an unlocking will occur. The Q output of the one-shot OS-U is fed through the diode D2 to the flip-flop FF causing it once more to toggle its values so as to enable the lock circuit and disable the unlock. This of course is the standby mode.

It is important to note that a locking action must occur to enable the unlock circuit. The bilateral gates BG3, BG4 are being fed by the opposite circuit's complementary output. The only task of this circuit is to protect the car's lock and unlock actuators from being driven from simultaneous pulses.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An automatic locking and unlocking unit for a vehicle having an electric door lock system for locking the doors of said vehicle, said unit comprising:

an AND gate having a first AND gate input, second AND gate input, and an output, with said first AND gate input, and said second AND gate input being in electrical communication with the starter and ignition connections of an ignition switch of said vehicle;

a NOR gate having a first NOR gate input, a second NOR gate input, and an output, with said first NOR gate input, and said second NOR gate input being in electrical communication with the starter and ignition connections of said ignition switch of said vehicle;

a first bilateral gate having inputs and an output, with one of said first bilateral gate inputs in electrical communication with said output of said AND gate;

a second bilateral gate having inputs and an output, with one of said second bilateral gate inputs in electrical communication with said output of said NOR gate;

a flip flop having at least one input and a pair of outputs, with said at least one flip flop input in electrical communication with both said output of said first bilateral gate and said output of said second bilateral gate, with one of said outputs of said flip flop in electrical communication with another of said inputs of said first bilateral gate, and another of said outputs of said flip flop in electrical communication with another of said inputs of said second bilateral gate, whereby only of said first and second bilateral gates is conductive at one time;

wherein said output of said first bilateral gate is in electrical communication with said electric door lock system to effect locking of said doors, and said output of said second bilateral gate is in electrical communication with said electric door lock system to effect unlocking of said doors.

2. An automatic locking and unlocking unit for a vehicle having an electric door lock system for locking the doors of said vehicle, said unit comprising:

an AND gate having a first AND gate input, a second AND gate input, and an output, with said first AND gate input, and said second AND gate input being in electrical communication with the starter and ignition connections of an ignition switch of said vehicle;

a NOR gate having a first NOR gate input, a second NOR gate input, and an output, with said first NOR gate input, and said second NOR gate input being in electrical communication with the starter and ignition connections of said ignition switch of said vehicle;

a first bilateral gate having inputs and an output, with one of said first bilateral gate inputs in electrical communication with said output of said AND gate;

a second bilateral gate having inputs and an output, with one of said second bilateral gate inputs in electrical communication with said output of said NOR gate;

a first one-shot having a first one-shot input, a first one-shot first output, and a first one-shot second output, with said first one-shot input in electrical communication with said first bilateral gate output, and said first one-shot first output in electrical communication with said electric door lock system to effect locking of said doors upon energization of said first one-shot;

a second one-shot having a second one-shot input, a second one-shot first output, and second one-shot second output, with said second one-shot input in electrical communication with said second bilateral gate output, and said second one-shot first output in electrical communication with said electric door lock system to effect locking of said doors upon energization of said second one-shot;

a flip flop having at least one input and a pair of outputs, with said at least one input in electrical communication with both said first one-shot first output and said second one-shot first output, with one of said outputs of said flip flop in electrical communication with another of said inputs of said first bilateral gate, and another of said outputs of said flip flop in electrical communication with another of said inputs of said second bilateral gate, whereby only of said first and second bilateral gates is conductive at one time;

wherein said output of said first bilateral gate is in electrical communication with said electric door lock system to effect locking of said doors, and said output of said second bilateral gate is in electrical communication with said electric door lock system to effect unlocking of said doors.

3. An automatic locking and unlocking unit for a vehicle having an electric door lock system for locking the doors of said vehicle, said unit comprising:

an AND gate having a first AND gate input, a second AND gate input, and an output, with said first AND gate input, and said second AND gate input being in electrical communication with the starter and ignition connections of an ignition switch of said vehicle;

a NOR gate having a first NOR gate input, a second NOR gate input, and an output, with said first NOR gate input, and said second NOR gate input being in electrical communication with the starter and ignition connections of said ignition switch of said vehicle;

a first bilateral gate having inputs and an output, with one of said first bilateral gate inputs in electrical communication with said output of said AND gate;

a second bilateral gate having inputs and an output, with one of said second bilateral gate inputs in electrical communication with said output of said NOR gate;

a first one-shot having a first one-shot input, a first one-shot first output, and first one-shot second output, with said first one-shot input in electrical communication with said output of said first bilateral gate;

a second one-shot having a second one-shot input, a second one-shot first output, and second one-shot second output, with said second one-shot in electrical communication with said output of said second bilateral gate;

a third bilateral gate having inputs and an output, with one of said third bilateral gate inputs in electrical communication with said output of said first one-shot first output, said third bilateral gate output in electrical communication with said electric door lock system to effect locking of said doors upon energization of said first one-shot, and another of said third bilateral gate inputs being in electrical communication with said second one-shot second output;

a fourth bilateral gate having inputs and an output, with one of said fourth bilateral gate inputs in electrical communication with said output of said second one-shot first output, said fourth bilateral gate output in electrical communication with said electric door lock system to effect unlocking of said doors upon energization of said second one-shot, and another of said fourth bilateral gate inputs being in electrical communication with said first one-shot second output, whereby only of said third and fourth bilateral gates is conductive at one time;

a flip flop having at least one input and a pair of outputs, with said at least one input in electrical communication with both said first one-shot first output and said second one-shot first output, with one of said outputs of said flip flop in electrical communication with another of said inputs of said first bilateral gate, and another of said outputs of said flip flop in electrical communication with another of said inputs of said second bilateral gate, whereby only of said first and second bilateral gates is conductive at one time;

wherein said output of said first bilateral gate is in electrical communication with said electric door lock system to effect locking of said doors, and said output of said second bilateral gate is in electrical communication with said electric door lock system to effect unlocking of said doors.

4. The automatic locking and unlocking unit of claim 3, wherein said first one-shot outputs comprise a one second pulse output, and said second one-shot outputs comprise a one second pulse output.

* * * * *